US010913824B2

(12) United States Patent
Bode et al.

(10) Patent No.: US 10,913,824 B2
(45) Date of Patent: Feb. 9, 2021

(54) LIGNIN BASED COATING COMPOSITIONS

(71) Applicant: Akzo Nobel Coatings International B.V., Arnhem (NL)

(72) Inventors: Daniel Bode, Cleveland, OH (US); Pam Wilson, South Euclid, OH (US); Gary Pierce Craun, Berea, OH (US)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 16/106,450

(22) Filed: Aug. 21, 2018

(65) Prior Publication Data
US 2018/0355119 A1 Dec. 13, 2018

Related U.S. Application Data

(63) Continuation of application No. 14/652,480, filed as application No. PCT/EP2013/076820 on Dec. 17, 2013, now abandoned.

(60) Provisional application No. 61/738,432, filed on Dec. 18, 2012.

(30) Foreign Application Priority Data

Jan. 24, 2013 (EP) .................................... 13152520

(51) Int. Cl.
*C08H 7/00* (2011.01)
*C08G 18/64* (2006.01)
*C09D 197/00* (2006.01)
*C08L 63/08* (2006.01)

(52) U.S. Cl.
CPC ........... *C08H 6/00* (2013.01); *C08G 18/6492* (2013.01); *C08L 63/08* (2013.01); *C09D 197/005* (2013.01); *Y10T 428/1352* (2015.01); *Y10T 428/31511* (2015.04); *Y10T 428/31971* (2015.04)

(58) Field of Classification Search
CPC ...... C09D 197/005; C08L 63/00; C08L 63/08
See application file for complete search history.

(56) References Cited

U.S. PATENT DOCUMENTS

| | | | | | |
|---|---|---|---|---|---|
| 2,857,354 | A | * | 10/1958 | Fang | C08F 220/32 525/327.3 |
| 3,787,520 | A | * | 1/1974 | Labana | C08G 59/3209 525/108 |
| 3,886,101 | A | * | 5/1975 | Felicetta | C08H 6/00 527/401 |
| 4,130,515 | A | * | 12/1978 | Bornstein | C08G 16/0293 156/307.3 |
| 4,292,214 | A | * | 9/1981 | Blount | C08B 1/08 523/400 |
| 4,370,368 | A | * | 1/1983 | Hirata | B05D 7/02 428/36.6 |
| 4,393,106 | A | * | 7/1983 | Maruhashi | B29C 49/22 156/229 |
| 4,435,543 | A | | 3/1984 | Ema et al. | |
| 4,486,378 | A | * | 12/1984 | Hirata | B65D 23/02 264/512 |
| 4,486,557 | A | * | 12/1984 | Gaul | C08G 18/003 264/109 |
| 5,173,527 | A | * | 12/1992 | Calve | C09J 161/06 524/74 |
| 5,192,361 | A | * | 3/1993 | Schilling | C09D 11/14 106/123.13 |
| 5,373,070 | A | * | 12/1994 | Gardziella | C08L 97/005 524/14 |
| 5,833,883 | A | | 11/1998 | Afzali-Ardakani et al. | |
| 5,866,642 | A | * | 2/1999 | McVay | C08H 6/00 524/13 |
| 5,891,952 | A | * | 4/1999 | McCormick | C08G 12/46 524/596 |
| 6,284,838 | B1 | * | 9/2001 | Silbiger | C08L 89/00 524/13 |
| 6,339,116 | B1 | * | 1/2002 | Afzali-Ardakani | C08H 6/00 524/72 |
| 6,465,587 | B1 | * | 10/2002 | Bair | C04B 24/163 526/240 |
| 2003/0157268 | A1 | * | 8/2003 | Gutowski | B27K 3/346 427/532 |
| 2004/0122166 | A1 | * | 6/2004 | O'Brien-Bernini | C09J 133/04 525/54.31 |
| 2004/0249013 | A1 | * | 12/2004 | Tilquin | B27K 3/156 522/113 |
| 2005/0032967 | A1 | * | 2/2005 | Roberts, Sr. | C09D 5/02 524/515 |
| 2005/0058822 | A1 | * | 3/2005 | Ittel | B32B 27/12 428/304.4 |
| 2006/0091577 | A1 | * | 5/2006 | Shen | B27N 1/00 264/109 |
| 2007/0218307 | A1 | * | 9/2007 | Li | B27N 3/002 428/532 |
| 2008/0045420 | A1 | * | 2/2008 | Karagianni | C08F 246/00 507/121 |

(Continued)

FOREIGN PATENT DOCUMENTS

RU 2096434 C1 11/1997

*Primary Examiner* — Liam J Heincer
(74) *Attorney, Agent, or Firm* — Monique Raub

(57) ABSTRACT

The current invention includes coating compositions having a lignin, methods for coating substrates using the coating compositions, and substrates coated with the coating compositions. In some embodiments of the invention, a coating composition having a mixture of a) a lignin, b) a solvent, and c) a crosslinker, wherein the lignin has a neutral or negative charge. The current invention also includes a coating composition having a mixture of a) a lignin, b) a polymeric epoxy crosslinker having glycidyl (meth)acrylate, and c) a solvent. Additionally, the current invention includes a coating composition having a mixture of a) a lignin, b) a solvent, and c) a phenolic crosslinker.

9 Claims, No Drawings

(56) References Cited

U.S. PATENT DOCUMENTS

| | | | | |
|---|---|---|---|---|
| 2008/0182113 A1* | 7/2008 | Hausmann | C08L 3/08 | 428/458 |
| 2011/0159768 A1* | 6/2011 | Crescimanno | C08F 269/00 | 442/327 |
| 2012/0012035 A1* | 1/2012 | Blank | C04B 24/18 | 106/802 |
| 2012/0121913 A1* | 5/2012 | Chang | B32B 15/092 | 428/418 |
| 2012/0148740 A1* | 6/2012 | Yang | C08G 59/027 | 427/240 |
| 2012/0322990 A1* | 12/2012 | Passauer | C08H 6/00 | 530/502 |
| 2012/0329907 A1* | 12/2012 | Hong | C08J 3/12 | 523/401 |
| 2013/0101859 A1* | 4/2013 | Hirayama | C08F 8/00 | 428/441 |
| 2013/0116383 A1* | 5/2013 | Naskar | C08J 3/243 | 525/152 |
| 2013/0213550 A1* | 8/2013 | Berlin | C08L 97/00 | 156/62.2 |
| 2014/0039146 A1* | 2/2014 | Adam | C08H 6/00 | 528/98 |
| 2014/0154009 A1* | 6/2014 | Ashtekar | C08K 5/09 | 404/72 |
| 2016/0024337 A1* | 1/2016 | Bode | C09D 167/06 | 524/605 |
| 2016/0208134 A1* | 7/2016 | Zafar | C08G 59/22 | |
| 2016/0258113 A1* | 9/2016 | Edye | C09D 197/005 | |
| 2017/0342188 A1* | 11/2017 | Nakagawa | C08G 8/24 | |

\* cited by examiner

LIGNIN BASED COATING COMPOSITIONS

REFERENCE TO RELATED APPLICATIONS

This application is a continuation of U.S. patent application Ser. No. 14/652,480, filed Jun. 16, 2015 which is a national stage filing under 35 U.S.C. § 371 of PCT/EP2013/076820 filed Dec. 17, 2013 which claims priority of European Patent Application No. 13152520.6 filed Jan. 24, 2013 and U.S. Provisional Patent Application No. 61/738,432, filed Dec. 18 2012, the contents of which are each incorporated herein by reference in their entirety.

BACKGROUND OF THE INVENTION

1. Field of the Invention

The current invention relates to coating compositions comprising a lignin, methods of coating substrates with the coating compositions, and substrates coated with the coating compositions.

2. Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable.

There is a need to produce coating compositions that do not contain bisphenol A or are substantially free of bisphenol A. The lignin based coating compositions of the invention can be used in the preparation of coating compositions suitable, inter alia, as packaging coatings for food and beverage packaging and containers.

Consumers and brand owners desire coating compositions made from renewable sources, and using a lignin as a primary component in the coating composition provides a sustainable raw material base for food contact coatings.

SUMMARY OF THE INVENTION

The coating compositions of the invention provide good cure, solvent resistance, blush resistance, capability to retort, and resistance to aggressive foods and beverages, while providing a sustainable source for some of the raw materials in the coating composition.

The current invention includes coating compositions comprising a lignin, methods for coating substrates using the coating compositions, and substrates coated with the coating compositions. In some embodiments of the invention, the coating compositions comprise a mixture of a) a lignin, b) a solvent, and c) a crosslinker. The current invention also includes coating compositions comprising a mixture of a) a lignin, b) a polymeric epoxy crosslinker comprising glycidyl (meth)acrylate, and c) a solvent. Additionally, the current invention includes coating compositions comprising a mixture of a) a lignin, b) a solvent and c) a phenolic crosslinker. The lignin contained in the mixtures may have a neutral or a negative charge.

The coating compositions may be prepared by a method comprising the step of mixing a lignin, a solvent and a crosslinker. In some embodiments, the coating compositions may be prepared by a method comprising the step of mixing a lignin, a polymeric epoxy crosslinker comprising glycidyl (meth)acrylate, and a solvent. In addition, the coating compositions may be prepared by a method comprising the step of mixing a lignin, a solvent and a phenolic crosslinker.

Substrates coated with the coating compositions of the invention are also disclosed. In some embodiments, the substrate is a can or packaging for food or beverages.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

The current invention includes substrates coated at least in part with a coating composition and methods for coating the substrates. The term "substrate" as used herein includes, without limitation, cans, metal cans, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

The current invention includes coating compositions comprising a mixture of a) a lignin, b) a solvent, and c) a crosslinker. The current invention also includes coating compositions comprising a mixture of a) a lignin, b) a polymeric epoxy crosslinker comprising glycidyl (meth) acrylate, and c) a solvent. Additionally, the current invention includes coating compositions comprising a mixture of a) a lignin, b) a solvent, and c) a phenolic crosslinker. The lignin in the mixtures may have a neutral or a negative charge.

The term "mixture" as used herein means a solution prepared using the identified components. The term does not exclude the presence of other components which may or may not be specifically identified. In some embodiments, the lignin in the mixture is not a modified lignin or a reaction product of certain components.

Methods for preparing the coating compositions may include the step of mixing a lignin, a solvent and a crosslinker to form a mixture. In some embodiments, the coating compositions may be prepared by a method comprising the step of mixing a lignin, a polymeric epoxy crosslinker comprising glycidyl (meth)acrylate and a solvent to form a mixture. In addition, the coating compositions may be prepared by a method comprising the step of mixing a lignin, a solvent and a phenolic crosslinker to form a mixture.

Lignins generally have hydroxyl, phenolic and/or carboxylic acid functionality. The level of each functionality in a lignin depends on the bio-mass and the process conditions used to separate the lignin from cellulose and hemicelluloses in the biomass. Minor amounts of ash, cellulose and hemicelluloses are usually present in a lignin. In certain embodiments of the invention, the lignin is present in an amount of from about 1 to about 99 wt % of the coating composition.

Kraft, lignosulfates, and soda lignins are currently prepared in significant commercial quantities from hardwoods, softwoods and grasses (rice straw, wheat straw, hemp, bagasse, etc.) under basic conditions. Various other biomasses used to produce lignins include corn stover, switch grass, municipal waste streams and the like. Organosolve lignins are prepared in solvent mixtures that may include ethanol and water, and are generally acidic. Hydrolysis lignins are generally prepared under neutral or acidic conditions. Various processing steps are used to help break down the biomass to produce lignins, including steam explosion, cooking in water at temperatures that often exceed 100° C., exposure to supercritical water, supercritical carbon dioxide or other substances, and microbial and enzyme treatments. All customary preparation methods are likely suitable for use in the current invention.

Lignins suitable for use in the current invention are not limited. The lignin may be, for non-limiting example, a kraft lignin, a lignosulfate, an organosolve lignin, a hydrolysis lignin, a soda lignin, or a mixture thereof. In some embodiments, the lignin has a number average molecular weight from about 500 to 30,000. Generally, lignins having a high carboxylic acid content (above about 0.5 meq/g carboxylic acid), such as some soda lignins, are generally more suitable for use in water borne coatings, and are often used with a neutralizer. Lignins lower in carboxylic acid content (having less than about 0.5 meq/g carboxylic acid) are generally more suitable for use in solvent borne coatings.

The solvent used in the mixtures may comprise water, an organic solvent or a mixture thereof. The solvent may be present in an amount from about 1 to about 95 wt % of the coating composition. In certain instances, when the coating composition comprises water, a neutralizer may be used to assist in dispersing the lignin in the mixture. The neutralizer may include, without limitation, ammonia, a tertiary amine, such as, for non-limiting example, dimethylethanolamine, 2-dimethylamino-2-methyl-1-propanol, tributylamine, or a combination thereof. The neutralizer may be present in an amount from about 0% to about 200% based on of the molar amounts of acid and phenolic groups to be neutralized in the system.

The mixtures may be prepared with a crosslinker in an amount from about 1 to about 99 wt % of the coating composition. In some embodiments, the lignin is an unmodified lignin, meaning that the lignin is not a lignin polyol, does not include hydroxyl functionality, does include acrylate functionality, is not modified with a formaldehyde compound, and is not modified with an unsaturated acid. A non-limiting list of crosslinkers includes an epoxy crosslinker, such as sorbitol epoxy, butane diol diglycidyl ether, propylene oxide diglycidyl ether and the like, a polymeric epoxy crosslinker, benzoguanamine formaldehyde, glycoluril, melamine formaldehyde, a phenol formaldehyde crosslinker, urea formaldehyde, an isocyanate, a blocked isocyanate, and combinations thereof. The polymeric epoxy crosslinker may be an acrylic (co)polymer comprising glycidyl (meth)acrylate. Such an acrylic (co)polymer having glycidyl (meth)acrylate acts as a polymeric epoxy crosslinker by providing epoxy functionality to the acrylic (co) polymer. For embodiments having a phenolic crosslinker, cured coating compositions have been found to have excellent adhesion with high solvent resistance.

The polymeric epoxy crosslinker containing glycidyl (meth)acrylate may be prepared in a solvent by the addition of an ethylenically unsaturated monomer component and one or more initiators. In some embodiments, the ethylenically unsaturated monomer component and initiator are added to the solvent over about two hours at about 50 to about 150° C. The ethylenically unsaturated monomer component may include, without limitation, glycidyl (meth) acrylate, a vinyl monomer, an acrylic monomer, an allylic monomer, an acrylamide monomer, a vinyl ester including without limitation, a vinyl acetate, a vinyl propionate, a vinyl butyrate, a vinyl benzoate, a vinyl isopropyl acetate, and a similar vinyl ester, a vinyl halide including without limitation, a vinyl chloride, a vinyl fluoride and a vinylidene chloride, a vinyl aromatic hydrocarbon including without limitation, styrene, a methyl styrene and a similar lower alkyl styrene, a chlorostyrene, a vinyl toluene, a vinyl naphthalene, a vinyl aliphatic hydrocarbon monomer including without limitation, an alpha olefin such as for non-limiting example, ethylene, propylene, isobutylene, and cyclohexene, as well as a conjugated diene such as for non-limiting example, 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include without limitation, methyl vinyl ether, isopropyl vinyl ether, n-butyl vinyl ether, and isobutyl vinyl ether. Acrylic monomers include without limitation, monomers such as for non-limiting example, lower alkyl esters of acrylic or methacrylic acid having an alkyl ester portion containing between about 1 to about 10 carbon atoms, as well as aromatic derivatives of acrylic and methacrylic acid. Acrylic monomers include, for non-limiting example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, and amino acrylates and methacrylates. The ethylenically unsaturated monomer component may be from about 1 to about 99 wt % of the coating composition.

Suitable initiators for preparing the polymeric epoxy crosslinker include free radical initiators such as benzoyl peroxide, t-butyl peroctoaate, t-butyl perbenzoate, various percarbonates, and the like. Generally, the initiators are used at about 0.5 to 10% by weight of the ethylenically unsaturated monomer component mixture. Suitable solvents for preparing the polymeric epoxy crosslinker include butanol, butyl cellosolve, butyl acetate, xylene, and other common solvents. Generally, the solvent is preheated to a suitable reaction temperature of about 50 to about 150° C. and is used at a level which will give final polymer solids of about 10 to about 90%.

The polymeric epoxy crosslinker which contains glycidyl (meth)acrylate is epoxy functional and thus capable of crosslinking with the lignin, wherein the lignin crosslinks the acrylic (co)polymer and/or the acrylic (co)polymer crosslinks the lignin. Water borne lignins have carboxyl groups that can be neutralized with an amine-based neutralizer, so the lignins can be said to function similar to surfactants and most likely help to disperse the glycidyl (meth)acrylate-based acrylic (co)polymers into water.

The coating compositions of the invention can include conventional additives known to those skilled in the art, such as without limitation, additives to control foam, reduce equilibrium and dynamic surface tension, control rheology and surface lubricity. Amounts can vary depending on desired coating application and performance in any manner known to those skilled in the art.

One or more coating compositions of the invention are applied to a substrate in some embodiments, such as for non-limiting example, cans, metal cans, packaging, containers, receptacles, can ends, or any portions thereof used to hold or touch any type of food or beverage. In some embodiments, one or more coatings are applied in addition to the coating composition of the current invention, such as for non-limiting example, a prime coat may be applied between the substrate and a coating composition of the current invention.

The coating compositions can be applied to substrates in any manner known to those skilled in the art. In some embodiments, the coating compositions are sprayed or roll coated onto a substrate. When spray applied, the coating composition may contain, for non-limiting example, about 10% and about 30% by weight polymeric solids relative to about 70% to about 90% water including other volatiles such as, without limitation, minimal amounts of solvents, if desired. For some applications, typically those other than spraying (such as roll coating), the polymeric dispersions can contain, for non-limiting example, from about 20% to about 60% by weight polymer solids. Organic solvents are utilized in some embodiments to facilitate spraying, roll coating or other application methods and such solvents include, without limitation, n-butanol, 2-butoxy-ethanol-1, xylene, toluene, and mixtures thereof. In some embodiments, n-butanol is used in combination with 2-butoxy-ethanol-1. The coating compositions of the current invention may be pigmented and/or opacified with known pigments and opacifiers in some embodiments. For many uses, including food use for non-limiting example, the pigment is titanium dioxide. The resulting aqueous coating composition may be applied in some embodiments by conventional methods known in the coating industry. Thus, for non-limiting example, spraying, rolling, dipping, and flow coating application methods can be used for both clear and pigmented films. In some embodiments, after application onto a substrate, the coating may be cured thermally at temperatures in the range from about 130° C. to about 250° C., and alternatively higher for time sufficient to effect complete curing as well as volatilizing of any fugitive component therein. In some embodiments, the coating composition is not capable of being sufficiently cured with radiation.

For substrates intended as food or beverage containers, the coating compositions may be applied at a rate in the range from about 0.5 to about 15 milligrams of polymer coating per square inch of exposed substrate surface. In some embodiments, the water-dispersible coating is applied at a thickness between about 1 and about 25 microns

EXAMPLES

The invention will be further described by reference to the following non-limiting examples. It should be understood that variations and modifications of these examples can be made by those skilled in the art without departing from the spirit and scope of the invention.

Example 1

1.0 g of Protobind 1000 soda lignin (ALM India), 0.2 ml of dimethyl ethanol amine, 3.2 g of water and 0.71 g of a phenol formaldehyde crosslinker (70% solids) were stirred to form a uniform solution and drawn down with a #7 draw down rod over a 5×5 inch 80# electro tin plate steel panel. The resulting composition was baked for 10 minutes at 400 F in a gas fired oven. The cured film was able to withstand 60 MEK double rubs, it had 50% adhesion (by cross hatch tape off method), a 2H pencil hardness, and no cracking from 20 inch pounds of reverse impact. After 1 hour in boiling water, the film was not blushed.

Example 2

0.80 g of Protobind 1000 soda lignin, 0.20 g of Cymel 303, 0.24 ml of dimethyl ethanol amine and 2.8 ml of water were stirred to form a uniform solution and baked in the same manner as Example 1. The cured film had an HB pencil hardness, 0% adhesion, withstood 100 MEK double rubs, had no blush, and had some cracking after 20 inch pounds of reverse impact.

Example 3

1.0 g of an organosolve lignin, 0.36 g of a phenol formaldehyde resin and 3.6 g of butyl cellosolve were stirred to form a uniform solution and baked in the same manner as Example 1. The cured film was able to withstand 100 MEK double rubs, it has a 2H pencil hardness, 100% adhesion, no cracking after 20 inch pounds of reverse impact and no blush.

Example 4

An acrylic (co)polymer was prepared from a solution of 20 g of glycidyl methacrylate, 20 g of styrene, 60 g of butyl acrylate, and 6.0 g of benzoyl peroxide (70% in water). The resulting solution was added to 100 g of butyl cellosolve at 120 C over 2 hours. The resulting solution was held for 30 minutes. Next, 1.0 g of t-butyl peroctoate was added then held for 90 minutes. The resulting acrylic (co)polymer solution was cooled.

0.70 g of an organosolve lignin, 0.60 g of the acrylic (co)polymer solution prepared above and 1.7 g of butyl cellosolve were stirred to form a uniform solution and baked in the same manner as Example 1. The cured film had an HB pencil hardness, 100% adhesion, was able to withstand 100 MEK double rubs, had no cracking after 20 inch pounds of reverse impact and no blush.

Example 5

0.80 g of LignoBoost (Kraft fuel lignin, Metzo), 0.40 g of a phenolic resin, 2.6 g of butyl cellosolve and 0.2 g water were stirred to form a uniform solution and baked in the same manner as Example 1. The cured film had 100% adhesion, a 2H pencil hardness, was able to withstand 100 MEK double rubs, had no cracking after 20 inch pounds of reverse impact and no blush.

Example 6

An acrylic (co)polymer was prepared from a solution of 30 g of glycidyl methacrylate, 30 g of hydroxyl propyl methacrylate, 30 g of butyl acrylate, 10 g of methyl methacrylate and 6.0 g of benzoyl peroxide (70% in water). The resulting solution was added to 100 g of butyl cellosolve at 120 C over 2 hours. The resulting solution was held for 30 minutes. Next, 1.0 g of t-butyl peroctoate was added then held for 30 minutes. The resulting acrylic (co)polymer solution was cooled.

0.70 g of LignoBoost, 0.60 g of the acrylic (co)polymer solution, 0.2 g of water and 1.5 g of butyl cellosolve were stirred to form a uniform solution and baked in the same manner as Example 1. The cured film had a 2H pencil hardness, 100% adhesion, was able to withstand 100 MEK double rubs, had no blush and no cracking after 20 inch pounds of reverse impact.

What is claimed is:

1. A method of coating a substrate being a can or packaging for food or beverages, comprising the steps of:
applying a coating composition comprising:
  an unmodified lignin;
  a polymeric epoxy crosslinker, wherein the polymeric epoxy crosslinker includes glycidyl (meth)acrylate; and
  a solvent
to the can or packaging for food or beverages, and
curing the coating composition at a temperature in a range from about 130 degrees Celsius to about 250 degrees Celsius to obtain a coated can or packaging for food or beverages;
wherein the coating composition is substantially free of bisphenol A.

2. The method of claim 1, wherein the coating composition includes polymeric dispersions having between about 10% to about 60% by weight polymeric solids.

3. The method of claim 1, wherein the lignin has a neutral or a negative charge.

4. The method of claim 1, wherein the composition is sprayed or roll coated onto the substrate.

5. A can or packaging usable for packaging food that is coated with the coating composition of claim 1.

6. A method of coating a substrate being a can or packaging for food or beverages, comprising the steps of:
applying a coating composition that is substantially free of bisphenol A, said coating composition comprising:
  an unmodified lignin;
  a polymeric epoxy crosslinker, wherein the polymeric epoxy crosslinker includes glycidyl (meth)acrylate; and
  a solvent
to the can or packaging for food or beverages and thermally curing the coating composition at a temperature in a range from about 130 degrees Celsius to about 250 degrees Celsius to obtain a coated can or packaging for food or beverages.

7. The method of claim 6, wherein the lignin has a neutral or a negative charge.

8. The method of claim 6, wherein the coating composition includes polymeric dispersions having between about 10% to about 60% by weight polymeric solids.

9. A can or packaging usable for packaging food coated with the coating composition of claim 6.

* * * * *